(12) United States Patent
Chung

(10) Patent No.: US 8,461,810 B2
(45) Date of Patent: Jun. 11, 2013

(54) CIRCUIT FOR GENERATING BOOSTED VOLTAGE AND METHOD FOR OPERATING THE SAME

(75) Inventor: Kyu-young Chung, Seoul (KR)

(73) Assignee: MagnaChip Semiconductor, Ltd., Cheongju-si (KR)

( * ) Notice: Subject to any disclaimer, the term of this patent is extended or adjusted under 35 U.S.C. 154(b) by 311 days.

(21) Appl. No.: 12/898,813

(22) Filed: Oct. 6, 2010

(65) Prior Publication Data

US 2011/0148384 A1    Jun. 23, 2011

(30) Foreign Application Priority Data

Dec. 17, 2009  (KR) .................. 10-2009-0126071
Apr. 19, 2010  (KR) .................. 10-2010-0035631

(51) Int. Cl.
*G05F 1/00* (2006.01)

(52) U.S. Cl.
USPC .......................................... 323/222; 323/283

(58) Field of Classification Search
USPC .................... 323/222, 283; 363/59
See application file for complete search history.

(56) References Cited

U.S. PATENT DOCUMENTS

| | | | |
|---|---|---|---|
| 6,459,330 B2 | 10/2002 | Yasue | |
| 6,657,876 B2 | 12/2003 | Satoh | |
| 7,285,939 B2 * | 10/2007 | Ito | ................ 323/222 |
| 7,671,572 B2 | 3/2010 | Chung | |
| 2001/0024139 A1 | 9/2001 | Yasue | |
| 2007/0236189 A1 | 10/2007 | Chung | |

FOREIGN PATENT DOCUMENTS

| | | |
|---|---|---|
| JP | 2003-295830 A | 10/2003 |
| KR | 10-2001-0100772 A | 11/2001 |
| KR | 10-2003-0083922 A | 11/2003 |
| KR | 10-2006-0099707 | 9/2006 |
| KR | 10-0761842 B1 | 9/2007 |
| KR | 10-2007-0111331 | 11/2007 |

OTHER PUBLICATIONS

Notice of Allowance issued on Dec. 22, 2011, in corresponding Korean Patent Application No. 10-2010-0035631.

* cited by examiner

*Primary Examiner* — Shawn Riley
(74) *Attorney, Agent, or Firm* — NSIP Law

(57) ABSTRACT

A boosted voltage generation circuit may include: a boosting circuit configured to boost an input voltage based on a boosting rate and output a boosted voltage, a boosting rate setting unit configured to receive a feedback on a level of the input voltage and set a boosting rate, and an input voltage level setting unit configured to set the level of the input voltage in response to a target level of the boosted voltage and the boosting rate.

42 Claims, 13 Drawing Sheets

CIRCUIT FOR GENERATING BOOSTED VOLTAGE AND METHOD FOR OPERATING THE SAME

CROSS-REFERENCE TO RELATED APPLICATIONS

The present application claims the benefit of Korean Patent Application No. 10-2009-0126071, filed on Dec. 17, 2009, and Korean Patent Application No. 10-2010-0035631, filed on Apr. 19, 2010, the entire disclosure of each of which is incorporated herein by reference in its entirety for all purposes.

BACKGROUND

1. Field

The following description relates to a circuit for generating a boosted voltage which is higher than an input voltage, and a method for operating the boosted voltage generation circuit.

2. Description of Related Art

Diverse semiconductor devices operate internal circuits with a voltage supplied from the outside. As diverse levels of voltages are used in the internal constituent elements of a semiconductor device, it is difficult to supply all the voltages to be used in the inside of the semiconductor device from the outside of the device. Therefore, semiconductor devices are equipped with an internal voltage generation circuit to generate diverse levels of voltages inside the device.

Particularly, a device using a battery power source should be able to generate higher levels of voltage than the level of an input power source voltage inputted from the outside when the level of a power source voltage supplied from a battery is low and the levels of driving voltages to be used inside the device are higher than the level of the input power source voltage. DC-DC converters which generate a higher level of voltage than the level of input voltage are divided into a switched mode power supply (SMPS) type using an inductor and a charge pump type using a capacitor. In case of mobile devices, since the current consumption is not great, they are usually of the charge pump type.

Unlike a linear power supply, the pass transistor of an SMPS switches very quickly (typically between 50 kHz and 1 MHz) between full-on and full-off states, which minimizes wasted energy. Voltage regulation is provided by varying the ratio of on time to off time. In contrast, a linear power supply must dissipate the excess voltage to regulate the output. This higher efficiency is the chief advantage of the SMPS. Switching regulators are used as replacements for the linear regulators when higher efficiency, smaller size and/or lighter weight are required.

FIG. 1 is a block diagram showing voltage, signal, and output voltage of a boosted voltage generation circuit.

An input voltage VCIN and boosting rate BT[a:0] are inputted into the boosted voltage generation circuit 100. The boosted voltage generation circuit 100 boosts the input voltage VCIN based on the boosting rate represented by the boosting rate BT[a:0], and generates a boosted voltage VOUT. For example, when the boosting rate BT[a:0] is 2, which means two times or double, the boosted voltage generation circuit 100 boosts the input voltage VCIN two times (i.e., doubles the voltage), and generates the boosted voltage VOUT.

Although the target values of the boosted voltage VOUT are the same, there may be diverse input voltages VCIN and boosting rates BT[a:0] in the boosted voltage generation circuit 100. For instance, when the target value of the boosted voltage VOUT is 3V, (a) the boosted voltage VOUT of 3V may be generated by boosting an input voltage VCIN of 1.5V two times (i.e., doubling), or (b) the boosted voltage VOUT of 3V may be generated by boosting an input voltage VCIN of 1V three times (i.e., tripling). However, although the same boosted voltage VOUT is generated, the amount of current consumed by the boosted voltage generation circuit 100 may be greatly different based on how the input voltage VCIN and the boosting rate BT[a:0] are set.

However, conventional power supplies do not optimize the input voltage VCIN and the boosting rate BT[a:0] inputted into the boosted voltage generation circuit 100 according to the target level of the boosted voltage VOUT.

SUMMARY

In one general aspect, there is provided a boosted voltage generation circuit, including: a boosting circuit configured to: boost an input voltage based on a boosting rate, and output a boosted voltage, a boosting rate setting unit configured to: receive a feedback on a level of the input voltage, and set the boosting rate, and an input voltage level setting unit configured to set the level of the input voltage in response to: a target level of the boosted voltage, and the boosting rate.

In the boosted voltage generation circuit, the input voltage level setting unit may be further configured to set a target level of the input voltage according to a value of: (the target level of the boosted voltage/the boosting rate).

In the boosted voltage generation circuit, the boosting rate setting unit may be further configured to increase the boosting rate in response to the target level of the input voltage going out of a level range of the input voltage.

In the boosted voltage generation circuit, the boosting rate setting unit may be further configured to decrease the boosting rate in response to the target level of the input voltage falling in the level range of the input voltage while the boosting rate is decreased.

In the boosted voltage generation circuit, the input voltage level setting unit may include: an output voltage divider configured to: divide the boosted voltage by a rate determined based on the boosting rate, and output divided voltages, an input reference voltage selector configured to select an input reference voltage based on the boosting rate among a plurality of voltages generated based on the target level of the boosted voltage, a comparator configured to: compare an output voltage of the output voltage divider with an output voltage of the input reference voltage selector, and generate a preliminary input voltage, and an amplifier configured to: amplify the preliminary input voltage, and generate the input voltage.

In the boosted voltage generation circuit, the amplifier comprises: a comparator configured as a linear regulator; and a plurality of resistors.

In the boosted voltage generation circuit, the output voltage divider may be further configured to divide the boosted voltage at a rate of: 1/(the boosting rate*an amplification rate of the amplifier).

In the boosted voltage generation circuit, the input reference voltage selector may be further configured to select an input reference voltage which is the target level according to: the boosted voltage/(the boosting rate*an amplification rate of the amplifier).

In the boosted voltage generation circuit, the input voltage level setting unit further includes a voltage clamp configured to prevent the preliminary input voltage from increasing or decreasing excessively.

In the boosted voltage generation circuit, the voltage clamp may include an analog multiplexer configured to select a lower clamp voltage among voltages inputted in response to the boosting rate.

In the boosted voltage generation circuit, the input voltage level setting unit may further include a compensation circuit configured to stabilize the level of the preliminary input voltage.

In the boosted voltage generation circuit, the compensation circuit comprises: a resistor; and a capacitor.

In the boosted voltage generation circuit, the boosting rate setting unit may include: a voltage divider configured to generate: a boosting rate up reference voltage, and a boosting rate down reference voltage, a flag signal generator configured to: enable a boosting rate up flag signal in response to the preliminary input voltage being higher than the boosting rate up reference voltage, and enable a boosting rate down flag signal in response to the preliminary input voltage being lower than the boosting rate down reference voltage, and a boosting rate controller configured to set the boosting rate in response to the boosting rate up flag signal and/or the boosting rate down flag signal.

In the boosted voltage generation circuit, the boosting rate setting unit may further include an initial value determiner configured to provide the boosting rate controller with information on an initial value of the boosting rate.

In the boosted voltage generation circuit, the initial value determiner may include a plurality of comparators configured to compare respective input reference voltage values with an initial reference voltage.

In the boosted voltage generation circuit, the boosting rate controller may be further configured to: increase the boosting rate in response to the boosting rate up flag signal being enabled for more than a reference time, and decrease the boosting rate in response to the boosting rate down flag signal being enabled for more than a reference time.

In the boosted voltage generation circuit, the boosting rate controller may include: a plurality of counters, a plurality of comparators, a plurality of flip-flops, an initial value decoder, and a pre settable up/down counter.

In the boosted voltage generation circuit, the pre-settable up/down counter may be configured to set an initial booting rate signal inputted thereinto as an initial value of the boosting rate, in response to the boosting rate up flag signal being logic high, a first counter of the plurality of counters may be configured to count a clock to increase an up count value, and in response to the increasing up count value converging into the boosting rate up reference voltage, the pre-settable up/down counter may be further configured to enable an increase of the boosting rate.

In the boosted voltage generation circuit, the pre-settable up/down counter may be configured to set an initial booting rate signal inputted thereinto as an initial value of the boosting rate, in response to the boosting rate down flag signal being logic high, a second counter of the plurality of counters may be configured to count a clock to increase a down count value, and in response to the increasing down count value converging into the boosting rate down reference voltage, the pre-settable up/down counter may be further configured to enable a decrease of the boosting rate.

In the boosted voltage generation circuit, the pre-settable up/down counter may be configured to set an initial booting rate signal inputted thereinto as an initial value of the boosting rate, and in response to the boosting rate down flag signal being logic high, a second counter of the plurality of counters may be configured to count a clock to increase a down count value, the boosting rate down flag signal being shifted to logic low while increasing the down count value such that the down count value is not further increased, such that the pre-settable up/down counter does not enable a change of the boosting rate.

In the boosted voltage generation circuit, a level of the boosting rate up reference voltage may be determined according to: a power source voltage/(an amplification rate of the amplifier), and a level of the boosting rate down reference voltage may be determined according to: the power source voltage*(the boosting rate−a unit of a boosting rate change)/(the amplification rate of the amplifier*the boosting rate).

In another general aspect, there is provided a method for operating a boosted voltage generation circuit generating a boosted voltage by boosting an input voltage based on a boosting rate, the method including: generating the input voltage targeting a level of: (a target voltage of the boosted voltage/a boosting rate), increasing the boosting rate in response to the target level of the input voltage going out of a level range of the input voltage, and decreasing the boosting rate in response to the target level of the input voltage falling in the level range of the input voltage while the boosting rate is decreased.

In the method, the input voltage may not have a level higher than a power source voltage.

In the method, the decreasing of the boosting rate may be performed in response to the target level of the input voltage being lower than a value of: (the boosting rate−a unit of a boosting rate change)/the boosting rate.

In another general aspect, there is provided a method of generating a boosted voltage, including: boosting an input voltage based on a boosting rate, outputting a boosted voltage, receiving a feedback on a level of the input voltage, setting the boosting rate, and setting the level of the input voltage in response to: a target level of the boosted voltage, and the boosting rate.

The method may further include setting a target level of the input voltage according to a value of: (the target level of the boosted voltage/the boosting rate).

The method may further include increasing the boosting rate in response to the target level of the input voltage going out of a level range of the input voltage.

The method may further include decreasing the boosting rate in response to the target level of the input voltage falling in the level range of the input voltage while the boosting rate is decreased.

The method may further include: dividing the boosted voltage by a rate determined based on the boosting rate, outputting divided voltages, selecting an input reference voltage based on the boosting rate among a plurality of voltages generated based on the target level of the boosted voltage, comparing an output voltage with an input reference voltage, generating a preliminary input voltage, amplifying the preliminary input voltage, and generating the input voltage.

The method may further include dividing the boosted voltage at a rate of: 1/(the boosting rate*an amplification rate).

The method may further include selecting an input reference voltage which is the target level according to: the boosted voltage/(the boosting rate*an amplification rate).

The method may further include preventing the preliminary input voltage from increasing or decreasing excessively.

The method may further include selecting a lower clamp voltage among voltages inputted in response to the boosting rate.

The method may further include stabilizing the level of the preliminary input voltage.

The method may further include: generating: a boosting rate up reference voltage, and a boosting rate down reference voltage, enabling a boosting rate up flag signal in response to the preliminary input voltage being higher than the boosting rate up reference voltage, enabling a boosting rate down flag signal in response to the preliminary input voltage being lower than the boosting rate down reference voltage, and setting the boosting rate in response to the boosting rate up flag signal and/or the boosting rate down flag signal.

The method may further include providing information on an initial value of the boosting rate.

The method may further include comparing respective input reference voltage values with an initial reference voltage.

The method may further include: increasing the boosting rate in response to the boosting rate up flag signal being enabled for more than a reference time, and decreasing the boosting rate in response to the boosting rate down flag signal being enabled for more than a reference time.

In the method, a level of the boosting rate up reference voltage may be determined according to: a power source voltage/(an amplification rate of the amplifier), and a level of the boosting rate down reference voltage is determined according to: the power source voltage*(the boosting rate–a unit of a boosting rate change)/(the amplification rate of the amplifier*the boosting rate).

Other features and aspects may be apparent from the following detailed description, the drawings, and the claims.

Figure 1:
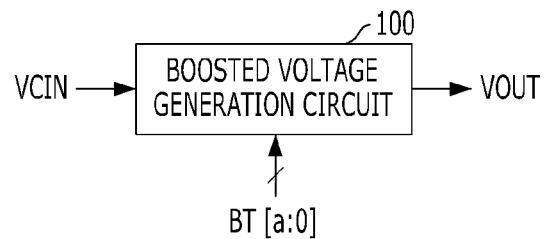
FIG. 1 is a block diagram showing voltage, signal, and output voltage of a boosted voltage generation circuit.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

Figure 2:
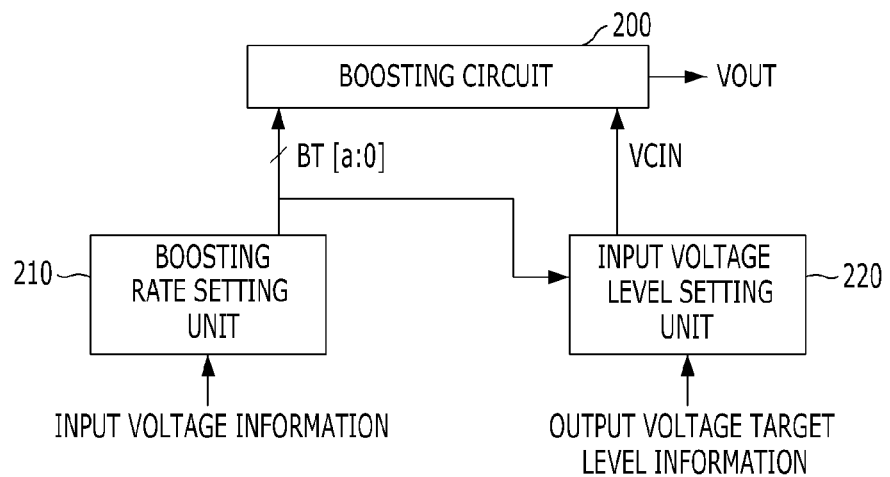
FIG. 2 is a block diagram illustrating a boosted voltage generation circuit in accordance with an embodiment.

FIG. 2 is a block diagram illustrating a boosted voltage generation circuit in accordance with an embodiment.

Referring to FIG. 2, the boosted voltage generation circuit includes a boosting circuit 200, a boosting rate setting unit 210, and an input voltage level setting unit 220.

The boosting circuit 200 may boost an input voltage VCIN based on a boosting rate BT[a:0] and may output a boosted voltage VOUT, which is an output voltage. Therefore, the boosted voltage VOUT may be a product of a multiplication of the input voltage VCIN by the boosting rate BT[a:0]. For example, when the boosting rate BT[a:0] is "2", and the input voltage VCIN is 1V, the boosted voltage VOUT may become 2V. When the boosting rate BT[a:0] is "3", and the input voltage VCIN is 0.8V, the boosted voltage VOUT may become 2.4V.

The input voltage level setting unit 220 may set the level of the input voltage VCIN in response to a target level of the boosted voltage VOUT and the boosting rate BT[a:0]. For example, the input voltage level setting unit 220 may set a value obtained by dividing the target level of boosted voltage VOUT by the boosting rate BT[a:0] (e.g., target level of boosted voltage VOUT/boosting rate BT[a:0]) as the target level of the input voltage VCIN. Although the target level of the input voltage VCIN may be the target level of boosted voltage VOUT divided by the boosting rate BT[a:0], the level of the input voltage VCIN may be lower than the value obtained by dividing the target level of boosted voltage VOUT by the boosting rate BT[a:0] (e.g., target level of boosted voltage VOUT/boosting rate BT[a:0]). The input voltage VCIN cannot be higher than a power source voltage VDD because the target level of the input voltage VCIN may exceed the level of the power source voltage VDD.

$$\text{VCIN} = \text{target level of boosted voltage VOUT/boosting rate BT}[a:0] \qquad \text{[Equation 1]}$$

The boosting rate setting unit 210 may receive a feedback on the level of the input voltage VCIN and may set the boosting rate BT[a:0]. The boosting rate setting unit 210 may increase the boosting rate BT[a:0] in response to the target level of the input voltage VCIN being at a level that the input voltage VCIN may not have. The target level of the input voltage VCIN may be determined as the value obtained by dividing the target level of the boosted voltage VOUT by the boosting rate BT[a:0] (target level of the boosted voltage VOUT/boosting rate BT[a:0]). In response to the value obtained by dividing the target level of the boosted voltage VOUT by the boosting rate BT[a:0] (e.g., target level of the boosted voltage VOUT/the boosting rate BT[a:0]) being higher than the power source voltage VDD, the input voltage VCIN may not converge into its target level. In this case, the boosting rate setting unit 210 may increase the boosting rate BT[a:0]. The boosting rate BT[a:0] may be raised only when it is desired to raise the boosting rate BT[a:0]. As the target level of the input voltage VCIN is the value obtained by dividing the target level of the boosted voltage VOUT by the boosting rate BT[a:0] (e.g., target level of the boosted voltage VOUT/boosting rate BT[a:0]), in response to the boosting rate BT[a:0] being increased, the target level of the input voltage VCIN may be decreased, as well.

The boosting rate setting unit 210 may decrease the boosting rate BT[a:0] in response to the target level of the input voltage VCIN being a level that the input voltage VCIN may have, although the boosting rate BT[a:0] may be decreased by one step. As the target level of the input voltage VCIN is the value obtained by dividing the target level of the boosted voltage VOUT by the boosting rate BT[a:0] (e.g., target level of the boosted voltage VOUT/boosting rate BT[a:0]), in response to the boosting rate BT[a:0] being decreased, the target level of the input voltage VCIN may be increased. If the boosting rate BT[a:0] is decreased and the target level of the input voltage VCIN is increased, and the increased target level of the input voltage VCIN becomes higher than the power source voltage VDD, the boosting rate BT[a:0] may be increased again.

The boosting rate setting unit 210 may perform all of the above operations. In other words, the boosting rate setting unit 210 may increase the boosting rate BT[a:0] only when it is desired to increase the boosting rate BT[a:0], and the boosting rate setting unit 210 may try to perform an operation for decreasing the boosting rate BT[a:0] as much as permissible.

The boosting operation is an operation for generating a higher level of voltage than the level of an input voltage. The higher the boosting rate becomes, the more current may be consumed. Therefore, in response to voltage of the same level being generated, the amount of current consumed for the boosting operation may be reduced by decreasing the boosting rate. For example, generating a voltage of 3V by boosting 2V 1.5 times consumes less current than generating a voltage of 3V by boosting 1V three times. According to an embodiment, as the boosting rate BT[a:0] is set to a minimal value through the operations of the boosting rate setting unit 210 and the input voltage level setting unit 220, the current consumption of the boosted voltage generation circuit may be minimized.

Figure 3:
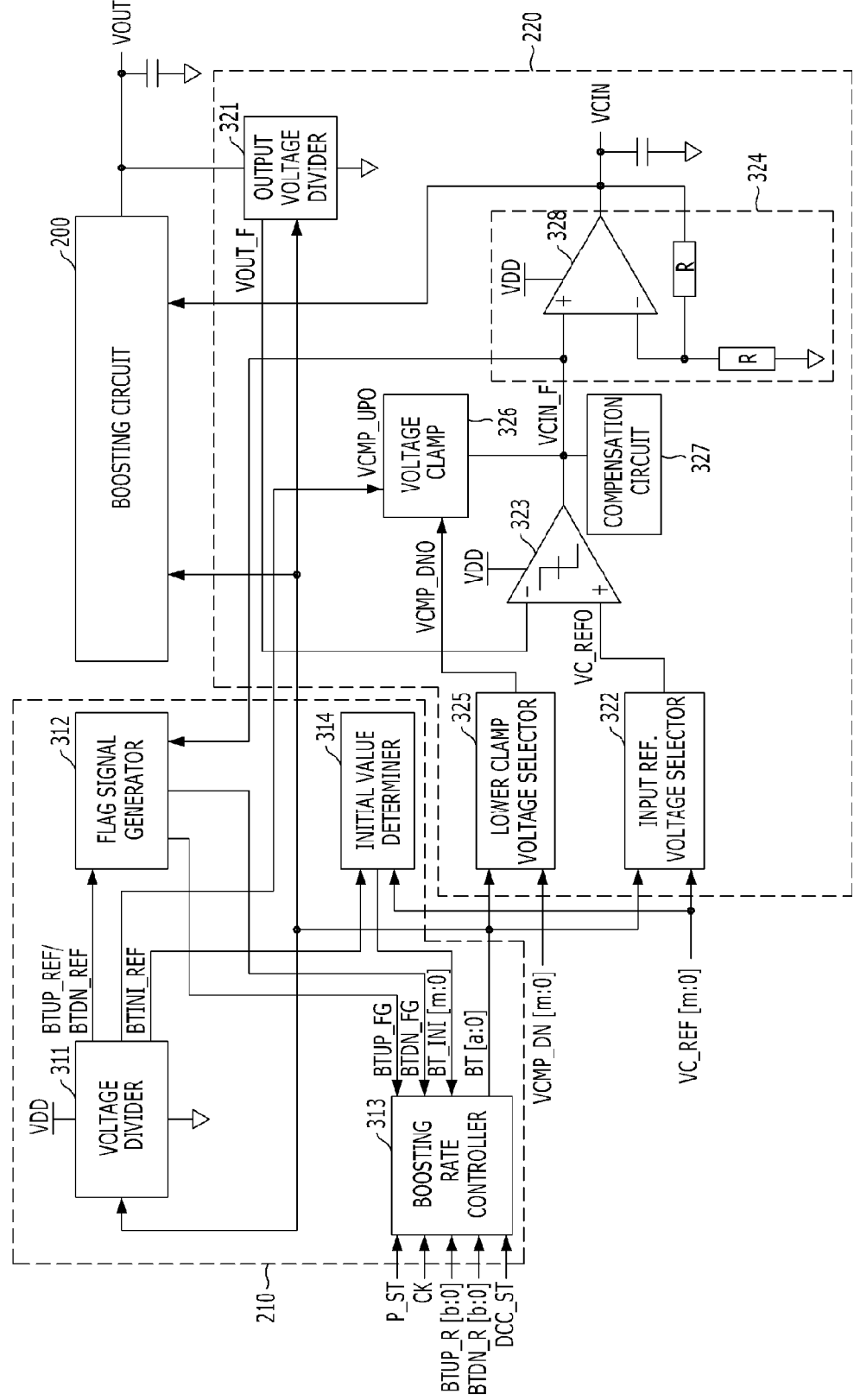
FIG. 3 is a detailed block diagram illustrating the boosted voltage generation circuit of FIG. 2.

FIG. 3 is a detailed block diagram illustrating the boosted voltage generation circuit of FIG. 2.

Referring to FIG. 3, the boosting rate setting unit 210 may include a voltage divider 311, a flag signal generator 312, a boosting rate controller 313, and an initial value determiner 314. The input voltage level setting unit 220 may include an output voltage divider 321, an input reference voltage selector 322, a comparator 323, an amplifier 324, a lower clamp voltage selector 325, a voltage clamp 326, and a compensation circuit 327.

The voltage divider 311 may generate a boosting rate up reference voltage BTUP_REF and a boosting rate down reference voltage BTDN_REF. The flag signal generator 312 may enable a boosting rate up flag signal BTUP_FG in response to a preliminary input voltage VCIN_F being higher than the boosting rate up reference voltage BTUP_REF. In response to the preliminary input voltage VCIN_F being lower than the boosting rate down reference voltage BTDN_REF, the flag signal generator 312 may enable a boosting rate down flag signal BTDN_FG. The boosting rate controller 313 may set the boosting rate BT[a:0] in response to the boosting rate up flag signal BTUP_FG and the boosting rate down flag signal BTDN_FG. The initial value determiner 314 may provide the boosting rate controller 313 with a signal BT_INI[m:0] on the initial value of the boosting rate BT[a:0].

The output voltage divider 321 may divide the boosted voltage VOUT by a rate determined based on the boosting rate BT[a:0], and may output at least one divided voltage. The input reference voltage selector 322 may select an input reference voltage VC_REF0 based on the boosting rate BT[a:0] among a plurality of voltages VR_REF[m:0] which may be generated based on the target level of the boosted voltage VOUT. The comparator 323 may compare an output voltage VOUT_F of the output voltage divider 321 with the output voltage VC_REF0 of the input reference voltage selector 322, and may generate the preliminary input voltage VCIN_F. The amplifier 324 may amplify the preliminary input voltage VCIN_F, and may generate the input voltage VCIN. The lower clamp voltage selector 325 may select a lower clamp voltage VCMP_DN0, and may output a selected lower clamp voltage. The voltage clamp 326 may control the preliminary input voltage VCIN_F not to be higher than an upper clamp voltage VCMP_UP0, and not to be lower than the lower clamp voltage VCMP_DN0, such that the preliminary input voltage VCIN_F does not become excessively high or low. The compensation circuit 327 may contribute to stabilizing the level of the preliminary input voltage VCIN_F. The structures and operations of the constituent elements will be described in detail with reference to the accompanying drawings.

Figure 4:
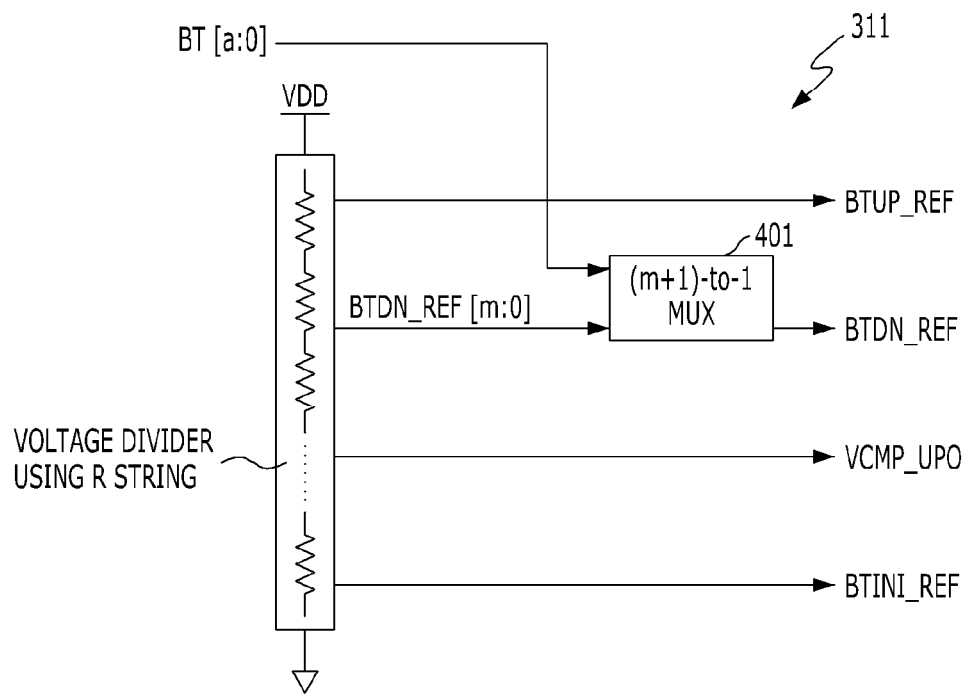
FIG. 4 is a schematic diagram illustrating a voltage divider in accordance with an embodiment.

FIG. 4 is a schematic diagram illustrating a voltage divider 311 in accordance with an embodiment.

Referring to FIG. 4, the voltage divider 311 may include a plurality of resistors coupled to the power source voltage VDD and ground, and an analog voltage multiplexer (MUX) 401. In the following examples (A) to (D), the boosting rate up reference voltage BTUP_REF, the boosting rate down reference voltage BTDN_REF, the upper clamp voltage VCMP_UP0, and an initial reference voltage BTINI_REF generated by the voltage divider 311 are described in detail.

(A) The boosting rate up reference voltage BTUP_REF is a reference voltage for increasing the boosting rate BT[a:0]. The boosting rate up reference voltage BTUP_REF may be compared with the preliminary input voltage VCIN_F. A result of the comparison may be used to determine whether or not to increase the boosting rate BT[a:0]. The preliminary input voltage VCIN_F is a voltage which may have, for example, half the level of the input voltage VCIN. In response to the input voltage VCIN being the same as the power source voltage VDD, it may be impossible for the input voltage VCIN to go higher, no matter how high the preliminary input voltage VCIN_F becomes. In short, when the preliminary input voltage VCIN_F has a level of power source voltage VDD/2, the boosted voltage VOUT may not be increased further even though the level of the preliminary input voltage VCIN_F is raised higher. Therefore, the voltage of the point may become the level of the boosting rate up reference voltage BTUP_REF. The level of the boosting rate up reference voltage BTUP_REF may be set to power source voltage VDD/2 because the boosting rate of the amplifier 324 may be 2. Therefore, to represent the boosting rate up reference voltage BTUP_REF in a general equation, the level of the boosting rate up reference voltage BTUP_REF may become the power source voltage VDD/boosting rate of the amplifier 324.

BTUP_REF=VDD/boosting rate of the amplifier [Equation 2]

(B) The boosting rate down reference voltage BTDN_REF is a reference voltage for decreasing the boosting rate BT[a:0]. The boosting rate down reference voltage BTDN_REF may be compared with the preliminary input voltage VCIN_F. decided result of the comparison may be used to determine whether or not to decrease the boosting rate BT[a:0]. Herein, m' denotes a boosting step and m starts from 0 step. Also, n' denotes a boosting rate between 0.5 and 1.5. In other words, the initial value of m is "0", and $0.5 \leq n' \leq 1.5$.

The following Table 1 represents the boosting step m' and the boosting rate n'. The input voltage VCIN is multiplied by a factor equal to the boosting rate n'.

TABLE 1

| Boosting Step m' | Boosting Rate n' |
|---|---|
| 0 step | 1.5 |
| 1 step | 2 |
| 2 step | 2.5 |
| 3 step | 3 |
| 4 step | 3.5 |

It may be seen from Table 1 that the boosting step m' and the boosting rate n' have a relationship according to Equation 3.

$$n'=(m'+3)/2 \quad \text{[Equation 3]}$$

The boosting rate down reference voltage BTDN_REF is set based on a point at which the level of the preliminary input voltage VCIN_F is lower than a value of power source voltage VDD/2, although the boosting rate n' becomes lower by one step. Therefore, when the boosting rate down reference voltage BTDN_REF is represented by the boosting step m', the boosting rate down reference voltage BTDN_REF may be set according to Equation 4.

$$BTDN\_REF(m')=VDD(m'+2)/((2*m')+6) \quad \text{[Equation 4]}$$

When the boosting rate down reference voltage BTDN_REF is represented by the boosting rate (n'), the boosting rate down reference voltage BTDN_REF may be set according to Equation 5.

$$BTDN\_REF(n')=VDD(n'-0.5)/(2*n') \quad \text{[Equation 5]}$$

The values used in Equation 5 are obtained based on the presumption that the amplification rate of the amplifier 324 is 2 and the difference of one boosting step is 0.5. These may be represented as the following Equation 6:

$$BTDN\_REF(n')=VDD(n'-\text{the unit of a boosting rate change})/(\text{the amplification rate of the amplifier}*n') \quad \text{[Equation 6]}$$

The analog voltage multiplexer 401, which may select the boosting rate down reference voltage BTDN_REF, may operate to select the above boosting rate down reference voltage BTDN_REF (BTDN_REF[m:0]) based on the amplification rate BT[a:0], which is a code having information on the amplification rate n'.

(C) The upper clamp voltage VCMP_UP0 may be inputted into the voltage clamp 326 in order to prevent a problem of increasing time that may be taken for the preliminary input voltage VCIN_F to converge into the target value when the level of the preliminary input voltage VCIN_F unnecessarily increases and the load condition or the boosting rate BT[a:0] is changed. The preliminary input voltage VCIN_F is significant to a point of:

$$VCIN\_F=VDD/2 \quad \text{[Equation 7]}$$

However, the preliminary input voltage VCIN_F may be higher than the point, and the upper clamp voltage VCMP_UP0 may be used to prevent the preliminary input voltage VCIN_F from increasing higher than the point. Therefore, the upper clamp voltage VCMP_UP0 may be set according to Equation 8.

$$VCMP\_UP0=VDD/2+a \quad \text{[Equation 8]}$$

Herein, "a" denotes a margin which may be, for example, not greater than approximately 50 mV.

(D) The initial reference voltage BTINI_REF is a reference voltage used to determine an appropriate boosting rate BT[a:0] during the initial boosting operation. In the initial operation, as it may be desirable that the input voltage VCIN begins in the same status as the power source voltage VDD, the initial reference voltage BTINI_REF may be set to a value of power source voltage VDD/2. If some margin is given in consideration of the operation current of the boosted voltage generation circuit, the initial reference voltage BTINI_REF may be set to a value of power source voltage (VDD/2+β), where β is a value of approximately 50 mV.

Figure 5:
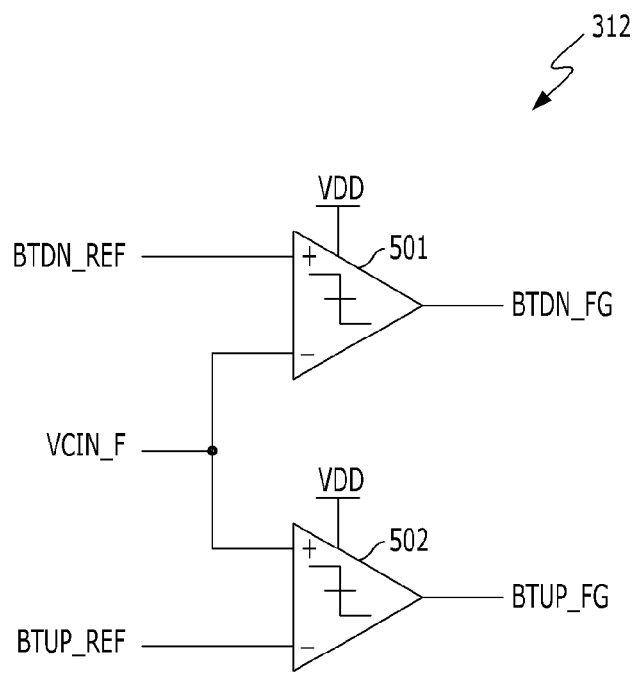
FIG. 5 is a schematic diagram illustrating a flag signal generator in accordance with an embodiment.

FIG. 5 is a schematic diagram illustrating a flag signal generator 312 in accordance with an embodiment.

Referring to FIG. 5, the flag signal generator 312 may include two comparators 501 and 502. A first comparator 501 may compare the preliminary input voltage VCIN_F with the boosting rate down reference voltage BTDN_REF, and may generate the boosting rate down flag signal BTDN_FG. A second comparator 502 may compare the preliminary input voltage VCIN_F with the boosting rate up reference voltage BTUP_REF, and may generate the boosting rate up flag signal BTUP_FG.

In response to the preliminary input voltage VCIN_F being lower than the boosting rate down reference voltage BTDN_REF, the boosting rate down flag signal BTDN_FG may be enabled to decrease the boosting rate BT[a:0]. In response to the preliminary input voltage VCIN_F being higher than the boosting rate up reference voltage BTUP_REF, the boosting rate up flag signal BTUP_FG may be enabled to increase the boosting rate BT[a:0].

In response to the preliminary input voltage VCIN_F being higher than the boosting rate down reference voltage BTDN_REF and lower than the boosting rate up reference voltage BTUP_REF, the boosting rate up flag signal BTUP_FG and the boosting rate down flag signal BTDN_FG may both be disabled. In one example, it means that the current boosting rate BT[a:0] is appropriate.

Figure 6:
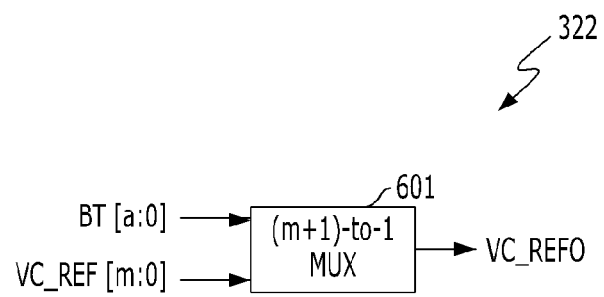
FIG. 6 is a schematic diagram illustrating an input reference voltage selector in accordance with an embodiment.

FIG. 6 is a schematic diagram illustrating an input reference voltage selector 322 in accordance with an embodiment.

Referring to FIG. 6, the input reference voltage selector 322 may include an analog voltage multiplexer (MUX) 601.

The input reference voltage VC_REF0 is a target value of the preliminary input voltage VCIN_F. Therefore, the input reference voltage VC_REF0 may be set to a value of $VOUT_{tar}/(2n')$, where $VOUT_{tar}$ denotes a target value of the boosted voltage VOUT. This is based on the presumption that the amplification rate is two times. The input reference voltage VC_REF0 may be calculated according to Equation 9.

$$VC\_REF0=VOUT_{tar}/(\text{amplification value of the amplifier } n') \quad \text{[Equation 9]}$$

When Equation 9 is converted into values based on n' and m' to obtain a value of VC_REF[m'] inputted into the analog voltage multiplexer (MUX) 601, VC_REF[m'] is set according to Equation 10.

$$VC\_REF[m']=VOUT_{tar}/(m'+3) \quad \text{[Equation 10]}$$

Therefore, VC_REF[m:0] may be set as above, and the analog voltage multiplexer (MUX) 601 may select a voltage that is appropriate for a corresponding boosting rate BT[a:0] as the input reference voltage VC_REF0.

Figure 7:
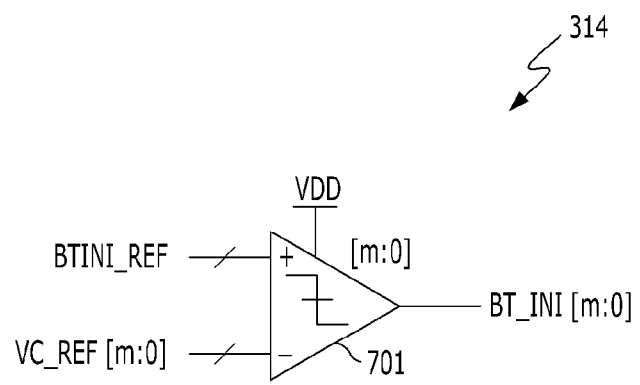
FIG. 7 is a schematic diagram illustrating an initial value determiner in accordance with an embodiment.

FIG. 7 is a schematic diagram illustrating an initial value determiner 314 in accordance with an embodiment.

Referring to FIG. 7, the initial value determiner 314 may include m+1 comparators 701 which may compare respective VC_REF[m:0] values with the initial reference voltage BTINI_REF. The m+1 comparators 701 may output a signal BT_INI[m:0] on the initial value of the boosting rate BT[a:0]. Although the comparators 701 are illustrated as one constituent element in the drawing, the number of the comparators 701 may be m+1, or another number, as appropriate. A first comparator may compare VC_REF[0] with the initial reference voltage BTINI_REF, and may output BT_INI[0]. A last comparator may compare VC_REF[m] with the initial reference voltage BTINI_REF, and may output BT_INI[m].

As the initial reference voltage BTINI_REF generated in the voltage divider 311 is (VDD/2+β) (see example (D) above), the information on the initial value may become information on whether the VC_REF[m:0] is higher than a value of (VDD/2+β). The initial boosting rate may be determined based on how many voltages among the VC_REF[m:0] are higher than (VDD/2+β), as shown in the following Table 2.

TABLE 2

| BT_INI[m:0] | Initial Boosting Rate |
|---|---|
| $2^m$ | n |
| $2^m + 2^{m-1}$ | n − 0.5 |
| $2^m + 2^{m-1} + 2^{m-2}$ | n − 1 |
| ... | ... |
| $2^m + 2^{m-1} + 2^{m-2} + \ldots + 2$ | 2 |
| $2^m + 2^{m-1} + 2^{m-2} + \ldots + 2 + 1 = 2^{m+1} − 1$ | 1.5 |

Table 2 shows that when BT_INI[m:0] is ($2^{m+1}-1$), e.g., at the last row of Table 2, when all the values of BT_INI[m:0] are logic high, the lowest boosting rate (1.5) may be taken as the initial boosting rate. When BT_INI[m:0] is ($2*m$), e.g., at the first row of Table 2, when only the value of BT_INI[m] is logic high, the highest boosting rate (n) may be taken as the initial boosting rate.

Figure 8:
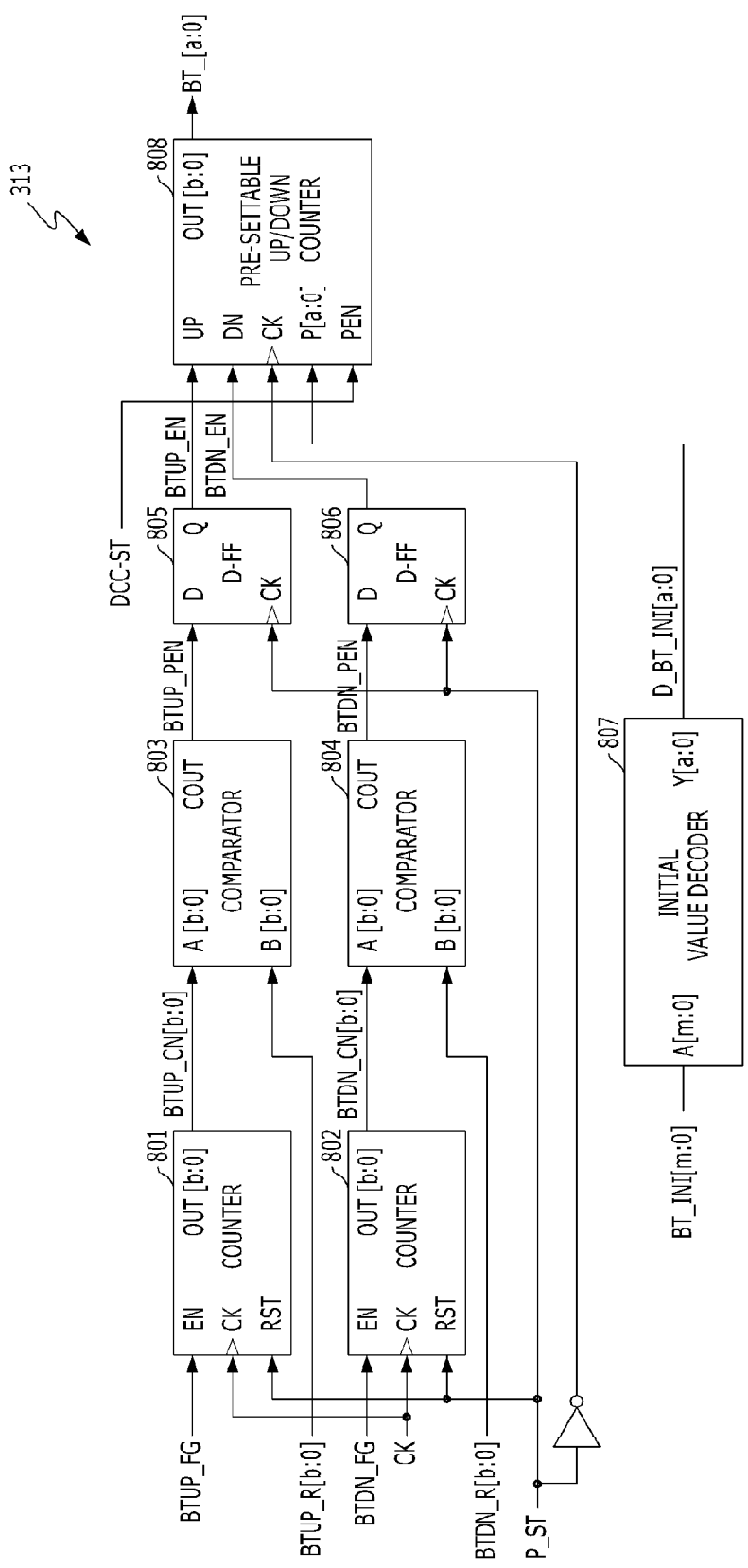
FIG. 8 is a schematic diagram illustrating a boosting rate controller in accordance with an embodiment.

FIG. 8 is a schematic diagram illustrating a boosting rate controller 313 in accordance with an embodiment.

The boosting rate controller 313 may increase the boosting rate BT[a:0] in response to the boosting rate up flag signal BTUP_FG being enabled for more than a reference time. The boosting rate controller 313 may decrease the boosting rate BT[a:0] in response to the boosting rate down flag signal BTDN_FG being enabled for more than a reference time.

The boosting rate controller 313 may include counters 801 and 802, comparators 803 and 804, D-flip-flops 805 and 806, an initial value decoder 807, and a pre-settable up/down counter 808. The elements of the boosting rate controller 313 will be described in detail later.

Figure 9:
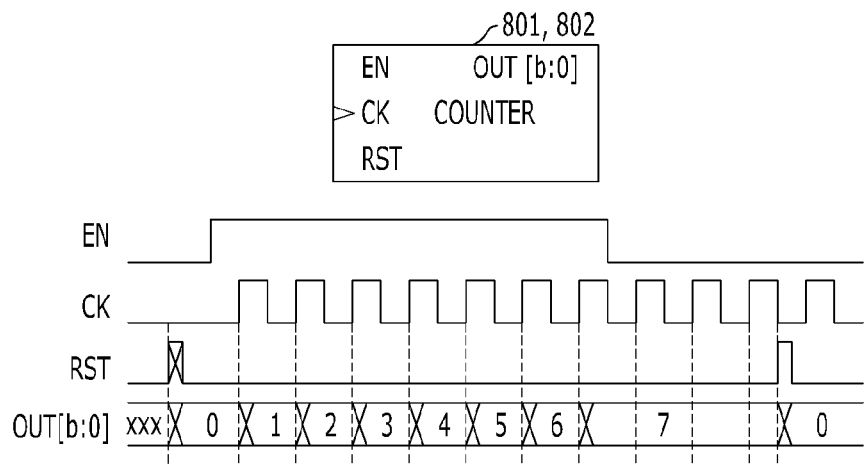
FIG. 9 illustrates an operation of counters.

FIG. 9 illustrates an operation of counters 801 and 802.

The counters 801 and 802 may perform an operation of increasing a code value BTUP_CNT[b:0] or BTDN_CNT[b:0] outputted to an output terminal OUT[b:0] at the rising edge of a clock CK in a period that a signal BTUP_FG or BTDN_FG inputted into an enable EN terminal is logic high. BTUP_CNT[b:0] is an up count signal; BTDN_CNT[b:0] is a down count signal. Also, in response to an initialization signal P_ST inputted into a reset RST terminal being logic high, all the bits of a code outputted to the terminal OUT[b:0] may be initialized to 0. Referring to FIG. 9, the operations of the counters 801 and 802 may be understood. The signal inputted into an RST terminal is a period signal P_ST, and the period signal P_ST may be enabled once during one period in which the boosting rate controller 313 changes the boosting rate BT[a:0].

Referring back to FIG. 8, the comparator 803 may compare the BTUP_CNT[b:0] outputted from the counter 801 with the boosting rate up reference value BTUP_R[b:0]. In response to the BTUP_CNT[b:0] value being greater than the boosting rate up reference value BTUP_R[b:0], the comparator 803 may output a boost up enable signal BTUP_PEN in logic high. In response to the BTUP_CNT[b:0] value being smaller than the boosting rate up reference value BTUP_R[b:0], the comparator 803 may output a signal BTUP_PEN in logic low.

The comparator 804 may compare the BTDN_CNT[b:0] with the boosting rate down reference value BTDN_R[b:0]. In response to the BTDN_CNT[b:0] value being greater than the boosting rate down reference value BTDN_R[b:0], the comparator 804 may output a signal BTDN_PEN in logic high. In response to the BTDN_CNT[b:0] value being smaller than the boosting rate down reference value BTDN_R[b:0], the comparator 804 may output a signal BTDN_PEN in logic low.

As the boosting rate up reference value BTUP_R[b:0] and the boosting rate down reference value BTDN_R[b:0] increase, the enablement time of the boosting rate up flag signal BTUP_FG and the boosting rate down flag signal BTDN_FG become longer.

The initial value decoder 807 may change the format of the BT_INI[m:0] generated in the initial value determiner 314. The following Table 3 represents the relationship between the BT_INI[m:0] and a D_BT_INI[a:0] and the initial boosting rates represented by them.

TABLE 3

| BT_INI[m:0] | D_BT_INI[a:0] | Initial Boosting Rate |
|---|---|---|
| $2^m$ | 2n − 3 | n |
| $2^m + 2^{m-1}$ | 2n − 4 | n − 0.5 |
| $2^m + 2^{m-1} + 2^{m-2}$ | 2n − 5 | n − 1 |
| ... | ... | ... |
| $2^m + 2^{m-1} + 2^{m-2} + \ldots + 2$ | 1 | 2 |
| $2^m + 2^{m-1} + 2^{m-2} + \ldots + 2 + 1 = 2^{m+1} − 1$ | 0 | 1.5 |

Figure 10:
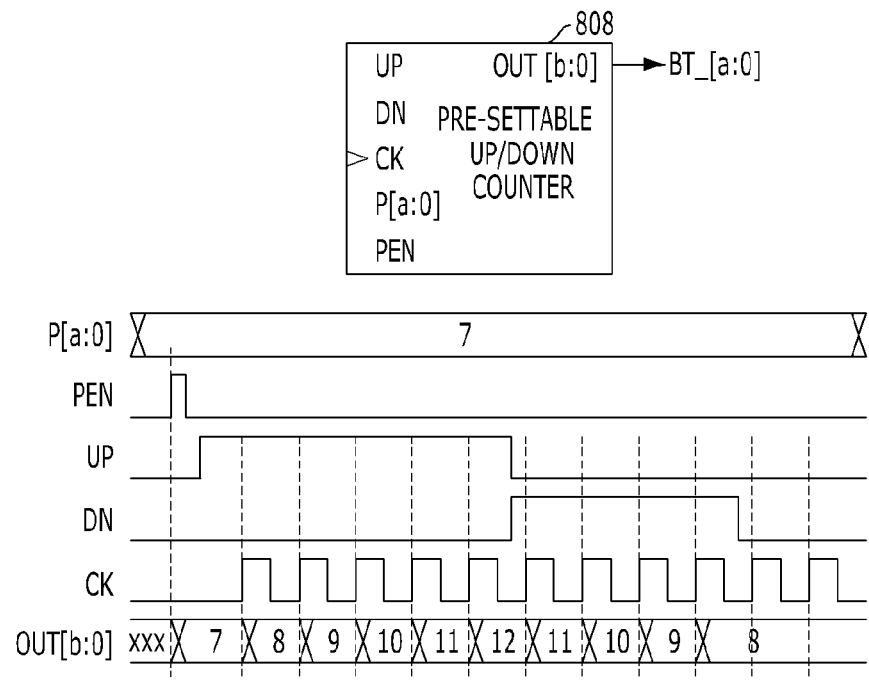
FIG. 10 illustrates an operation of a pre-settable up/down counter.

FIG. 10 illustrates an operation of a pre-settable up/down counter 808. The pre-settable up/down counter 808 may increase the code BT[a:0] value of the terminal OUT[a:0] by one at a rising edge of a CK terminal signal, which is an inverse signal of the P_ST signal, in response to the signal BTUP_EN inputted into an UP terminal being logic high. In response to the signal BTDN_DN inputted into a DN terminal being logic high, the pre-settable up/down counter 808 may decrease the code BT[a:0] value of the terminal OUT[a:0] by one at a rising edge of the CK terminal signal.

Also, in response to a DC conversion start signal DCC_ST of an enable terminal PEN being logic high, a code D_BT_INI[a:0] of a P[a:0] terminal may become a code BT[a:0] of the OUT[a:0] terminal. In short, in response to the signal of the PEN terminal being logic high, the boosting rate may be initialized into a value of D_BT_INI[a:0].

The DCC_ST signal inputted into the PEN terminal may be a signal enabled to logic high in response to the operation of the boosted voltage generation circuit being initiated.

The following Table 4 represents the relationship between the boosting rate code BT[a:0], which represent boosting rates, and initial boosting rates.

TABLE 4

| BT[a:0] | Initial Boosting Rate |
|---|---|
| 0 | 1.5 |
| 1 | 2 |
| 2 | 2.5 |
| ... | ... |

TABLE 4-continued

| BT[a:0] | Initial Boosting Rate |
|---|---|
| 2n − 4 | n − 0.5 |
| 2n − 3 | n |

Figure 11:
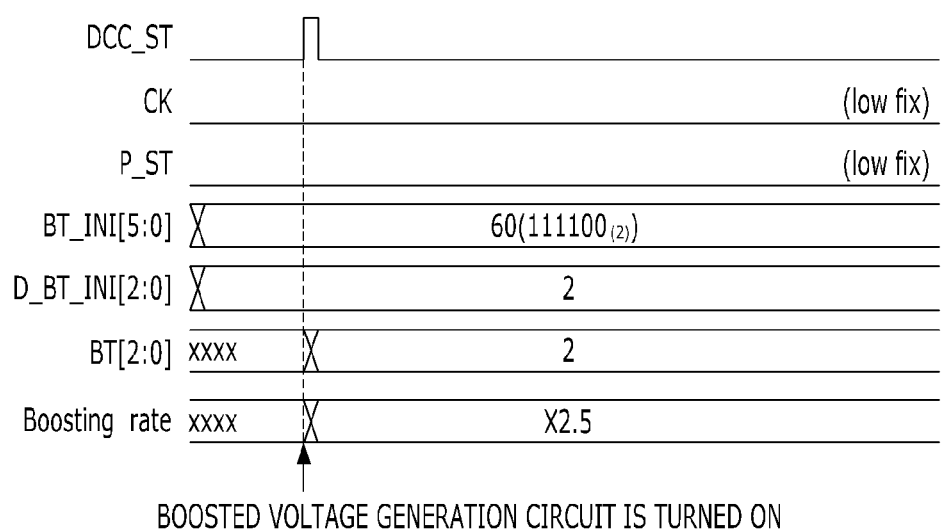
FIGS. 11 to 14 illustrate an operation of the boosting rate controller.
Figure 12:
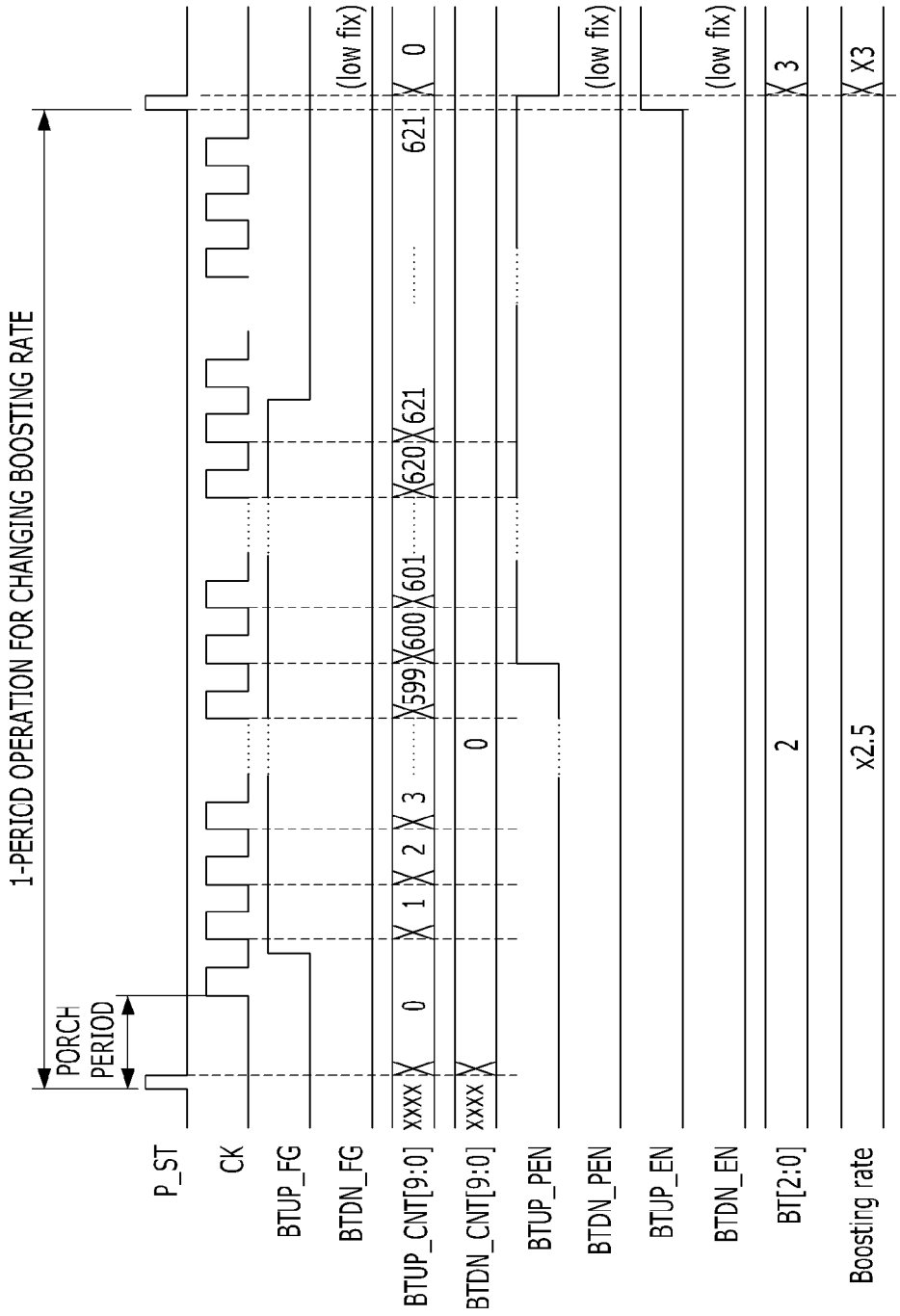
Figure 13:
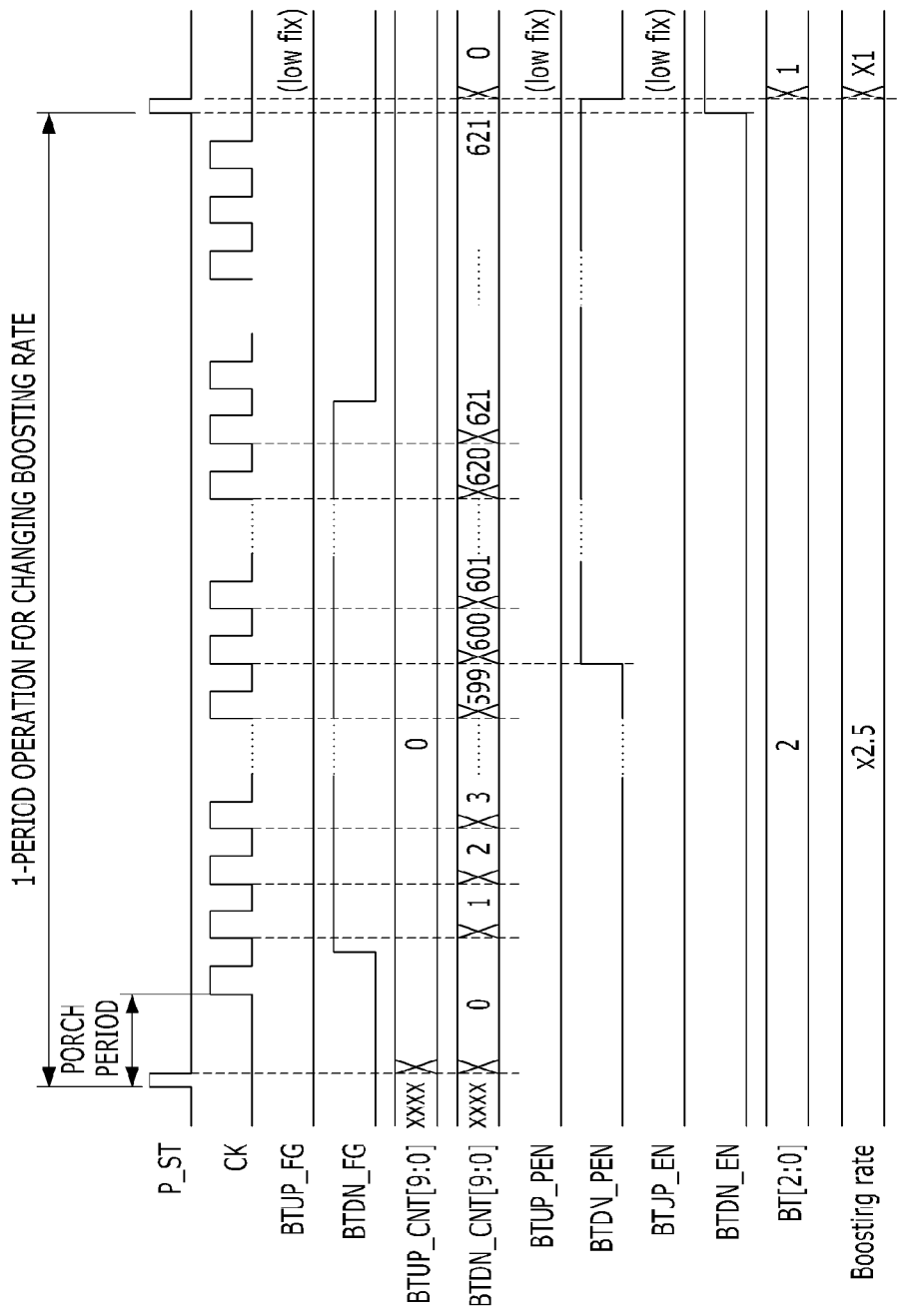
Figure 14:
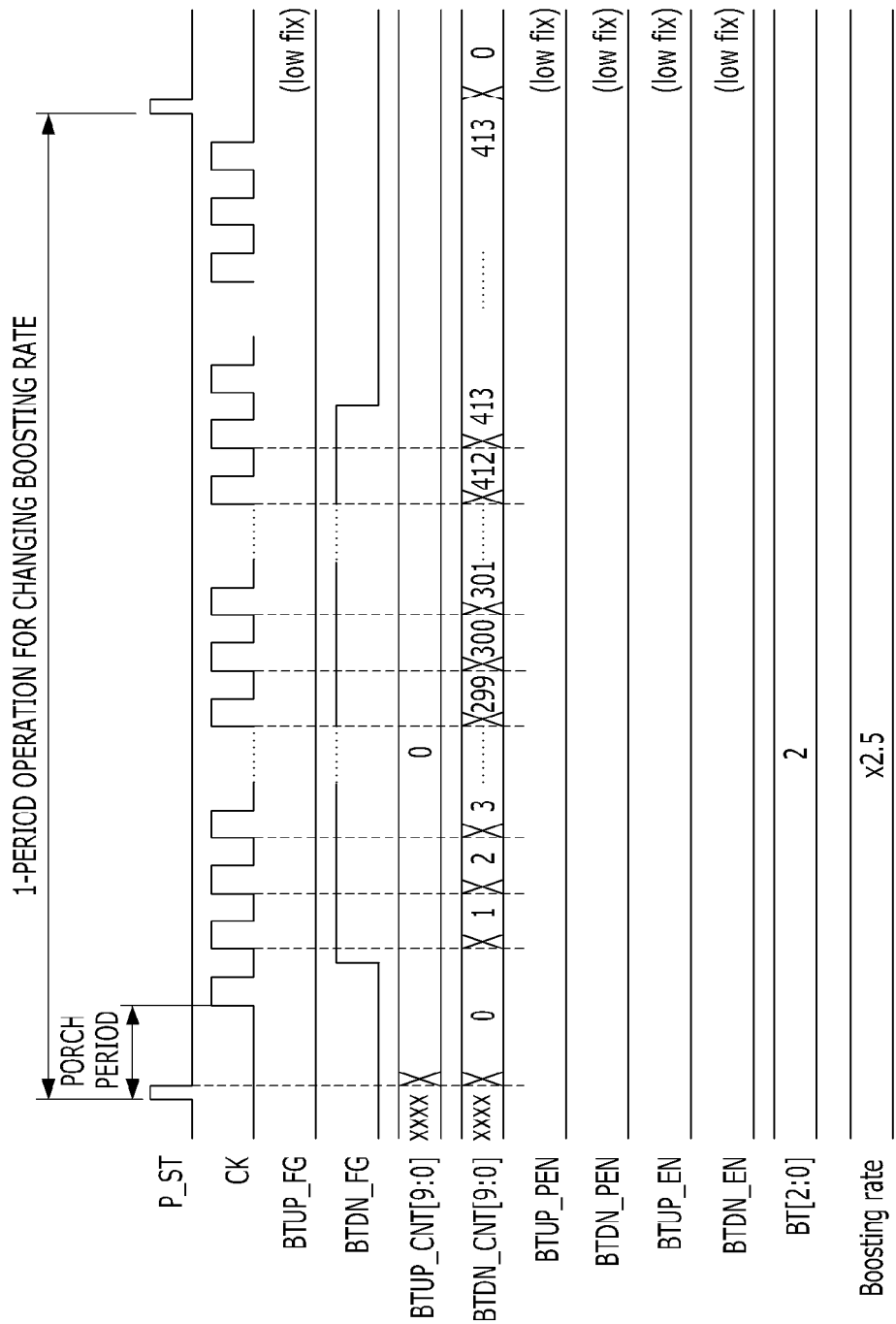

FIGS. 11 to 14 illustrate an operation of the boosting rate controller 313. FIG. 11 illustrates an initial operation of the boosting rate controller 313. FIG. 12 illustrates an operation of the boosting rate controller 313 increasing the boosting rate after the initial operation. FIG. 13 illustrates an operation of the boosting rate controller 313 decreasing the boosting rate after the initial operation. FIG. 14 illustrates an operation of the boosting rate controller 313 maintaining a boosting rate which is set during the initial operation.

Referring to FIG. 11, an initial operation of the boosting rate controller 313 is described.

After the operation of the boosted voltage generation circuit is initiated, the DCC_ST signal may be enabled to logic high. Then, the pre-settable up/down counter 808 may set D_BT_INI[2:0] inputted into its P[a:0] terminal as the initial value of the boosting rate BT[2:0]. FIG. 11 shows that the value of the D_BT_INI[2:0] is 2, and accordingly, the value of the code BT[2:0] representing the boosting rate is 2 in this example, and the boosting rate (2.5) corresponding to the BT[2:0] value (2), is set as the boosting rate. In other words, the boosting rate is 2.5 in the illustrated example. It should be appreciated that the values given are for example purposes only and other input values may provide different output values.

FIG. 12 illustrates an operation of the boosting rate controller 313 increasing the boosting rate after the initial operation. As an example, the boosting rate up reference value BTUP_R[9:0] and the boosting rate down reference value BTDN_R[9:0] may be set to 600.

After the P_ST signal is enabled and the P_ST signal goes through a porch period, a clock CK may begin toggling. In response to the boosting rate up flag signal BTUP_FG being logic high, the counter 801 may count the clock CK, and may gradually increase the BTUP_CNT[9:0] value. In response to the increasing BTUP_CNT[9:0] value converging into the boosting rate up reference value, e.g., BTUP_R[9:0]=600, a BTUP_PEN signal may be enabled to logic high. A BTUP_EN signal may be enabled by the BTUP_PEN signal which may be enabled to logic high. In response to the P_ST signal, which may be enabled again, the pre-settable up/down counter 808 may increase the code BT[2:0] value representing the boosting rate from 2 to 3. Therefore, the boosting rate may be increased from 2.5 to 3.

FIG. 13 illustrates an operation of the boosting rate controller 313 decreasing the boosting rate after the initial operation. As an example, the boosting rate up reference value BTUP_R[9:0] and the boosting rate down reference value BTDN_R[9:0] may be set to 600.

After the P_ST signal is enabled and the P_ST signal goes through a porch period, a clock CK may begin toggling. In response to the boosting rate down flag signal BTDN_FG being logic high, the counter 802 may count the clock CK, and may gradually increase the BTDN_CNT[9:0] value. In response to the increasing BTDN_CNT[9:0] value converging into the boosting rate down reference value, e.g., BTDN_R[9:0]=600, a BTUP_PEN signal may be enabled to logic high. A BTUP_EN signal may be enabled by the BTDN_PEN signal which may be enabled to logic high. In response to the P_ST signal, which may be enabled again, the pre-settable up/down counter 808 may decrease the boosting rate code BT[2:0] value representing the boosting rate from 2 to 1. Therefore, the boosting rate may be decreased from 2.5 to 2.

FIG. 14 illustrates an operation of the boosting rate controller 313 maintaining a boosting rate which is set during the initial operation. As an example, the boosting rate up reference value BTUP_R[9:0] and the boosting rate down reference value BTDN_R[9:0] may be set to 600.

After the P_ST signal is enabled and the P_ST signal goes through a porch period, a clock CK may begin toggling. In response to the boosting rate down flag signal BTDN_FG being logic high, the counter 802 may count the clock CK, and may gradually increase the BTDN_CNT[9:0] value. While increasing the BTDN_CNT[9:0] value, the boosting rate down flag signal BTDN_FG may be shifted to logic low. Therefore, the BTDN_CNT[9:0] value may not be increased any more from the value of 413, for example. As the BTDN_CNT[9:0] value may not converge into the boosting rate down reference value, e.g., BTDN_R[9:0]=600, the BTUP_PEN signal and the BTUP_EN signal may not be enabled. As a result, the pre-settable up/down counter 808 may not change the code BT[2:0] value, which represents the boosting rate. Therefore, the boosting rate may be maintained at 2.5.

In the example shown in FIG. 14, as the time at which the boosting rate down flag signal BTDN_FG is enabled does not converge into the reference time, e.g., 600 clock cycles, the boosting rate may not be changed. In other words, in the FIG. 14 example, even at 600 clock cycles, the BTDN_CNT[9:0] value is still stopped at 413, and will never reach 600, so no signal would be generated to change the boosting rate.

Figure 15:
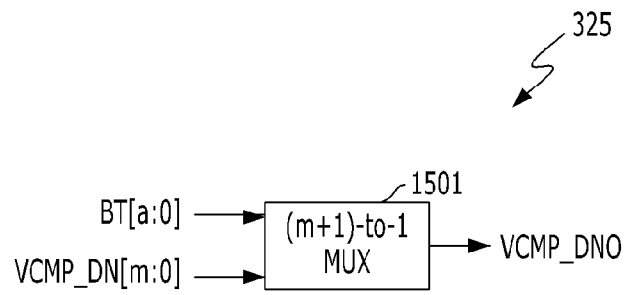
FIG. 15 is a block diagram illustrating a lower clamp voltage selector.

FIG. 15 is a block diagram illustrating the lower clamp voltage selector 325.

The lower clamp voltage selector 325 may include an analog multiplexer (MUX) 1501, and may select a lower clamp voltage VCMP_DN0 among the voltages VCMP_DN[m:0] inputted in response to the boosting rate BT[a:0].

The lower clamp voltage VCMP_DN0 may be inputted into the voltage clamp 326 to prevent time taken for the preliminary input voltage VCIN_F to converge into a target value from increasing, in response to the preliminary input voltage VCIN_F being too low and the load condition or the boosting rate BT[a:0] being changed.

Input voltage VCMP_DN[m:0] inputted into the lower clamp voltage selector 325 may be generated according to Equation 11.

$$VCMP\_DN[m']=VC\_REF[m']-a, \quad \text{[Equation 11]}$$

where a≈50 mV

The lower clamp voltage selector 325 may select an input voltage VCMP_DN[m:0] appropriate for the boosting rate BT[a:0] as a lower clamp voltage VCMP_DNO.

Figure 16:
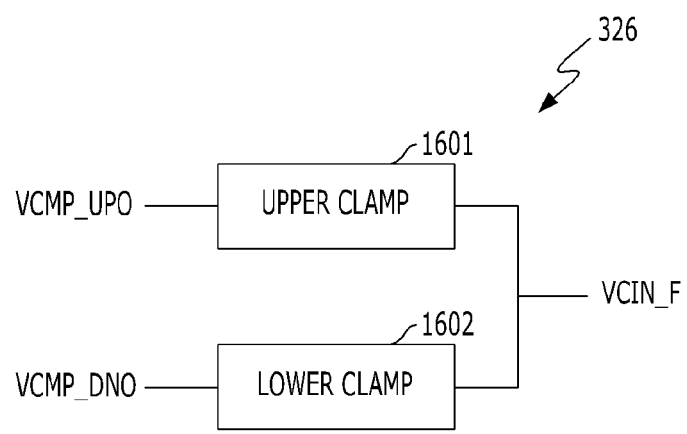
FIG. 16 is a block diagram illustrating a voltage clamp.

FIG. 16 is a block diagram illustrating the voltage clamp 326.

The voltage clamp 326 may include an upper clamp 1601 and a lower clamp 1602.

The upper clamp 1601 may generate a sinking current between ground terminals out of the preliminary input voltage VCIN_F, in response to the preliminary input voltage VCIN_F becoming higher than an upper clamp voltage VCMP_UPO to prevent the preliminary input voltage VCIN_F from becoming higher than the upper clamp voltage VCMP_UPO.

The lower clamp 1602 may generate a driving current between power source voltages VDD out of the preliminary input voltage VCIN_F, in response to the preliminary input voltage VCIN_F becoming lower than a lower clamp voltage VCMP_DNO to prevent the preliminary input voltage VCIN_F from becoming higher than the upper clamp voltage VCMP_DNO.

Figure 17:
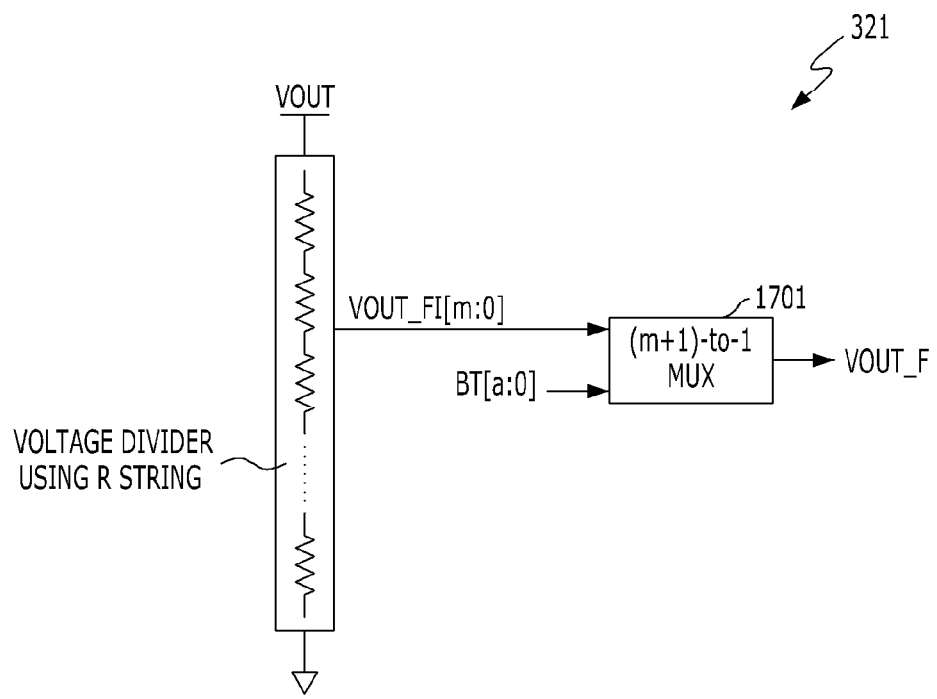
FIG. 17 is a block diagram illustrating an output voltage divider.

FIG. 17 is a block diagram illustrating the output voltage divider 321.

The output voltage divider 321 may include a plurality of resistors serially coupled to divide the boosted voltage VOUT and an analog voltage multiplexer (MUX) 1701.

In response to the current boosting rate BT[a:0] being n', the level of boosted voltage VOUT_F outputted from the output voltage divider 321 may be calculated according to Equation 12.

$$\text{VOUT}/(2*n') \quad [\text{Equation 12}]$$

This is because the amplification rate of the amplifier 324 is 2 in this example. The relationship may be represented more generally according to the following Equation 13.

$$\text{VOUT\_F} = (\text{VOUT}/(n'*\text{amplification rate of amplifier})) \quad [\text{Equation 13}]$$

When the VOUT/(2*n') is represented as a value based on m', it may be expressed according to Equation 14.

$$\text{VOUT\_F} = \text{VOUT}/(m'+3) \quad [\text{Equation 14}]$$

The analog voltage multiplexer (MUX) 1701 may operate to select an appropriate output voltage VOUT_F based on the boosting rate BT[a:0].

Figure 18:
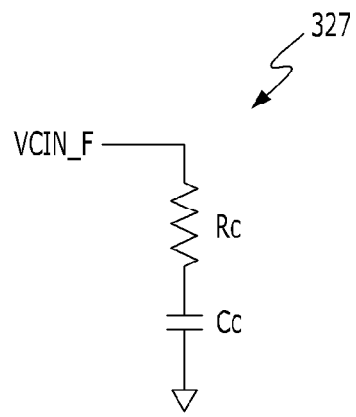
FIG. 18 is a block diagram illustrating a compensation circuit.

FIG. 18 is a block diagram illustrating the compensation circuit 327.

The compensation circuit 327 may include a resistor Rc and a capacitor Cc. The compensation circuit 327 may secure stability of a feedback loop which may generate the preliminary input voltage VCIN_F by adding a pole and/or a zero to a loop.

Referring back to FIG. 3, the comparator 323 may compare the output voltage VOUT_F of the output voltage divider 321 with the output voltage VC_REF0 of the input reference voltage selector 322, and may generate the preliminary input voltage VCIN_F.

In response to the output voltage VOUT_F of the output voltage divider 321 being higher than the input reference voltage VC_REF0, the comparator 323 may reduce the level of the preliminary input voltage VCIN_F. In response to the output voltage VOUT_F of the output voltage divider 321 being lower than the input reference voltage VC_REF0, the comparator 323 may raise the level of the preliminary input voltage VCIN_F.

In response to the output voltage VOUT_F of the output voltage divider 321 being higher than the input reference voltage VC_REF0, the level of the preliminary input voltage VCIN_F may be decreased. Therefore, the level of the input voltage VCIN may be decreased. This may be reflected into the output voltage VOUT, and the output voltage VOUT_F of the output voltage divider 321 may be decreased as well. The level of the preliminary input voltage VCIN_F may converge into the input reference voltage VC_REF0.

In response to the output voltage VOUT_F of the output voltage divider 321 being lower than the input reference voltage VC_REF0, the level of the preliminary input voltage VCIN_F may be raised. Therefore, the level of the input voltage VCIN may be increased. This may be reflected into the output voltage VOUT, and the output voltage VOUT_F of the output voltage divider 321 may be increased as well. The level of the preliminary input voltage VCIN_F may converge into the input reference voltage VC_REF0.

The amplifier 324 may include a comparator 328 as a linear regulator and two resistors R. The amplifier 324 may amplify the preliminary input voltage VCIN_F two times, e.g., amplify by 2, and may generate the input voltage VCIN. It should be appreciated that the amplification rate of the amplifier 324 may be changed into an amplification rate other than two times.

The overall operation of the boosted voltage generation circuit will now be described.

The input voltage level setting unit 220 may generate the input voltage VCIN targeting the level of (target output voltage/boosting rate). In other words, it may control the level of the input voltage VCIN according to Equation 15.

$$\text{VCIN} = \text{VOUT}_{tar}/n' \quad [\text{Equation 15}]$$

The boosting rate setting unit 210 may increase the boosting rate BT[a:0] in response to the target level ($\text{VOUT}_{tar}/n'$) of the input voltage VCIN being a level that the input voltage VCIN may not have, e.g., in response to the target level $\text{VOUT}_{tar}/n'$ exceeding the power source voltage. Even though the boosting rate BT[a:0] may be decreased by one step, if the target level of the input voltage VCIN is a level that the input voltage VCIN may not have, e.g., the target level of the input voltage VCIN being lower than the power source voltage, the boosting rate setting unit 210 may reduce the boosting rate BT[a:0].

Through the operations of the input voltage level setting unit 220 and the boosting rate setting unit 210, the boosting rate BT[a:0] may become as low as permissible, and the input voltage VCIN may be increased as high as permissible within the range such that the input voltage VCIN may not exceed the level of the power source voltage.

The higher the boosting rate BT[a:0] becomes, the more current the boosted voltage generation circuit may consume. According to an embodiment, the boosting rate BT[a:0] may be decreased as much as permissible and the current consumption of the boosted voltage generation circuit may be decreased through the operations of the boosting rate setting unit 210 and the input voltage level setting unit 220.

The boosted voltage generation circuit fabricated according to an embodiment may maximize the input voltage and may minimize the boosting rate in order to generate a boosted voltage of a target level. Therefore, the boosted voltage generation circuit may generate the boosted voltage of the target level by boosting the input voltage at the minimal boosting rate.

As a result, the boosted voltage generation circuit may maintain the minimal current consumption.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. For example, where applicable, the described hardware devices and/or components thereof may be configured to act as one or more software modules in order to perform the operations and process described above, or vice versa. The processes, functions, methods and/or software may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Accordingly, other implementations are within the scope of the following claims.

What is claimed is:

1. A boosted voltage generation circuit, comprising:
a boosting circuit configured to:
boost an input voltage based on a boosting rate; and
output a boosted voltage;
a boosting rate setting unit configured to:
receive a feedback on a level of the input voltage; and
set the boosting rate; and
an input voltage level setting unit configured to set the level of the input voltage in response to:
a target level of the boosted voltage; and
the boosting rate.

2. The boosted voltage generation circuit of claim 1, wherein the input voltage level setting unit is further configured to set a target level of the input voltage according to a value of:

(the target level of the boosted voltage/the boosting rate).

3. The boosted voltage generation circuit of claim 2, wherein the boosting rate setting unit is further configured to increase the boosting rate in response to the target level of the input voltage going out of a level range of the input voltage.

4. The boosted voltage generation circuit of claim 3, wherein the boosting rate setting unit is further configured to decrease the boosting rate in response to the target level of the input voltage falling in the level range of the input voltage while the boosting rate is decreased.

5. The boosted voltage generation circuit of claim 1, wherein the input voltage level setting unit comprises:
an output voltage divider configured to:
divide the boosted voltage by a rate determined based on the boosting rate; and
output divided voltages;
an input reference voltage selector configured to select an input reference voltage based on the boosting rate among a plurality of voltages generated based on the target level of the boosted voltage;
a comparator configured to:
compare an output voltage of the output voltage divider with an output voltage of the input reference voltage selector; and
generate a preliminary input voltage; and
an amplifier configured to:
amplify the preliminary input voltage; and
generate the input voltage.

6. The boosted voltage generation circuit of claim 5, wherein the amplifier comprises:
a comparator configured as a linear regulator; and
a plurality of resistors.

7. The boosted voltage generation circuit of claim 5, wherein the output voltage divider is further configured to divide the boosted voltage at a rate of:

1/(the boosting rate*an amplification rate of the amplifier).

8. The boosted voltage generation circuit of claim 7, wherein the input reference voltage selector is further configured to select an input reference voltage which is the target level according to:

the boosted voltage/(the boosting rate*an amplification rate of the amplifier).

9. The boosted voltage generation circuit of claim 5, wherein the input voltage level setting unit further comprises a voltage clamp configured to prevent the preliminary input voltage from increasing or decreasing excessively.

10. The boosted voltage generation circuit of claim 9, wherein the voltage clamp comprises an analog multiplexer configured to select a lower clamp voltage among voltages inputted in response to the boosting rate.

11. The boosted voltage generation circuit of claim 9, wherein the input voltage level setting unit further comprises a compensation circuit configured to stabilize the level of the preliminary input voltage.

12. The boosted voltage generation circuit of claim 11, wherein the compensation circuit comprises:
a resistor; and
a capacitor.

13. The boosted voltage generation circuit of claim 5, wherein the boosting rate setting unit comprises:
a voltage divider configured to generate:
a boosting rate up reference voltage; and
a boosting rate down reference voltage;
a flag signal generator configured to:
enable a boosting rate up flag signal in response to the preliminary input voltage being higher than the boosting rate up reference voltage; and
enable a boosting rate down flag signal in response to the preliminary input voltage being lower than the boosting rate down reference voltage; and
a boosting rate controller configured to set the boosting rate in response to the boosting rate up flag signal and/or the boosting rate down flag signal.

14. The boosted voltage generation circuit of claim 13, wherein the boosting rate setting unit further comprises an initial value determiner configured to provide the boosting rate controller with information on an initial value of the boosting rate.

15. The boosted voltage generation circuit of claim 14, wherein the initial value determiner comprises a plurality of comparators configured to compare respective input reference voltage values with an initial reference voltage.

16. The boosted voltage generation circuit of claim 13, wherein the boosting rate controller is further configured to:
increase the boosting rate in response to the boosting rate up flag signal being enabled for more than a reference time; and
decrease the boosting rate in response to the boosting rate down flag signal being enabled for more than a reference time.

17. The boosted voltage generation circuit of claim 16, wherein the boosting rate controller comprises:
a plurality of counters;
a plurality of comparators;
a plurality of flip-flops;
an initial value decoder; and
a pre settable up/down counter.

18. The boosted voltage generation circuit of claim 17, wherein:
the pre-settable up/down counter is configured to set an initial booting rate signal inputted thereinto as an initial value of the boosting rate;
in response to the boosting rate up flag signal being logic high, a first counter of the plurality of counters is configured to count a clock to increase an up count value; and
in response to the increasing up count value converging into the boosting rate up reference voltage, the pre-settable up/down counter is further configured to enable an increase of the boosting rate.

19. The boosted voltage generation circuit of claim 17, wherein:
the pre-settable up/down counter is configured to set an initial booting rate signal inputted thereinto as an initial value of the boosting rate;
in response to the boosting rate down flag signal being logic high, a second counter of the plurality of counters is configured to count a clock to increase a down count value; and
in response to the increasing down count value converging into the boosting rate down reference voltage, the pre-settable up/down counter is further configured to enable a decrease of the boosting rate.

20. The boosted voltage generation circuit of claim 17, wherein:
the pre-settable up/down counter is configured to set an initial booting rate signal inputted thereinto as an initial value of the boosting rate; and
in response to the boosting rate down flag signal being logic high, a second counter of the plurality of counters is configured to count a clock to increase a down count value, the boosting rate down flag signal being shifted to logic low while increasing the down count value such that the down count value is not further increased, such that the pre-settable up/down counter does not enable a change of the boosting rate.

21. The boosted voltage generation circuit of claim 13, wherein:
a level of the boosting rate up reference voltage is determined according to:

(a power source voltage/(an amplification rate of the amplifier); and a level of the boosting rate down reference voltage is determined according to:

(the power source voltage*(the boosting rate–a unit of a boosting rate change)/(the amplification rate of the amplifier*the boosting rate).

22. A method for operating a boosted voltage generation circuit generating a boosted voltage by boosting an input voltage based on a boosting rate, the method comprising:
generating the input voltage targeting a level of:

(a target voltage of the boosted voltage/the boosting rate);

increasing the boosting rate in response to the target level of the input voltage going out of a level range of the input voltage; and
decreasing the boosting rate in response to the target level of the input voltage falling in the level range of the input voltage while the boosting rate is decreased.

23. The method of claim 22, wherein the input voltage does not have a level higher than a power source voltage.

24. The method of claim 22, wherein the decreasing of the boosting rate is performed in response to the target level of the input voltage being lower than a value of:

(the boosting rate–a unit of a boosting rate change)/ the boosting rate.

25. A method of generating a boosted voltage, comprising:
boosting an input voltage based on a boosting rate;
outputting a boosted voltage;
receiving a feedback on a level of the input voltage;
setting the boosting rate; and
setting the level of the input voltage in response to:
a target level of the boosted voltage; and
the boosting rate.

26. The method of claim 25, further comprising setting a target level of the input voltage according to a value of:

(the target level of the boosted voltage/the boosting rate).

27. The method of claim 26, further comprising increasing the boosting rate in response to the target level of the input voltage going out of a level range of the input voltage.

28. The method of claim 27, further comprising decreasing the boosting rate in response to the target level of the input voltage falling in the level range of the input voltage while the boosting rate is decreased.

29. The method of claim 25, further comprising:
dividing the boosted voltage by a rate determined based on the boosting rate;
outputting divided voltages;
selecting an input reference voltage based on the boosting rate among a plurality of voltages generated based on the target level of the boosted voltage;
comparing an output voltage with an input reference voltage;
generating a preliminary input voltage;
amplifying the preliminary input voltage; and
generating the input voltage.

30. The method of claim 29, further comprising dividing the boosted voltage at a rate of:

1/(the boosting rate*an amplification rate).

31. The method of claim 30, further comprising selecting an input reference voltage which is the target level according to:

the boosted voltage/(the boosting rate*an amplification rate).

32. The method of claim 29, further comprising preventing the preliminary input voltage from increasing or decreasing excessively.

33. The method of claim 32, further comprising selecting a lower clamp voltage among voltages inputted in response to the boosting rate.

34. The method of claim 32, further comprising stabilizing the level of the preliminary input voltage.

35. The method of claim 29, further comprising:
generating:
a boosting rate up reference voltage; and
a boosting rate down reference voltage;
enabling a boosting rate up flag signal in response to the preliminary input voltage being higher than the boosting rate up reference voltage;
enabling a boosting rate down flag signal in response to the preliminary input voltage being lower than the boosting rate down reference voltage; and
setting the boosting rate in response to the boosting rate up flag signal and/or the boosting rate down flag signal.

36. The method of claim 35, further comprising providing information on an initial value of the boosting rate.

37. The method of claim 36, further comprising comparing respective input reference voltage values with an initial reference voltage.

38. The method of claim 35, further comprising:
increasing the boosting rate in response to the boosting rate up flag signal being enabled for more than a reference time; and
decreasing the boosting rate in response to the boosting rate down flag signal being enabled for more than a reference time.

39. The method of claim 35, wherein:

a level of the boosting rate up reference voltage is determined according to:

a power source voltage/(an amplification rate of the amplifier); and a level of the boosting rate down reference voltage is determined according to:

the power source voltage*(the boosting rate−a unit of a boosting rate change)/(the amplification rate of the amplifier*the boosting rate).

40. The method of claim 22, further comprising:
receiving a feedback on a level of the input voltage,
wherein the generating of the input voltage in based on the level of the input voltage received via the feedback.

41. The method of claim 22, further comprising:
outputting the generated boosted voltage.

42. The method of claim 40, further comprising:
outputting the boosted voltage.

* * * * *